(12) United States Patent
Rivault et al.

(10) Patent No.: US 8,079,547 B2
(45) Date of Patent: Dec. 20, 2011

(54) FLOTATION SYSTEMS

(75) Inventors: Jean-Yves Rivault, Cognac (FR); Stephane Berlureau, Cognac (FR)

(73) Assignee: Aerazur, S.A.S. (FR)

( * ) Notice: Subject to any disclaimer, the term of this patent is extended or adjusted under 35 U.S.C. 154(b) by 926 days.

(21) Appl. No.: 11/940,409

(22) Filed: Nov. 15, 2007

(65) Prior Publication Data

US 2009/0302155 A1 Dec. 10, 2009

Related U.S. Application Data

(60) Provisional application No. 60/970,587, filed on Sep. 7, 2007.

(51) Int. Cl.
*B64C 25/56* (2006.01)
(52) U.S. Cl. .................................... 244/100 A
(58) Field of Classification Search ............. 244/100 A, 244/101, 106, 905, 107; 114/345; 441/40
See application file for complete search history.

(56) References Cited

U.S. PATENT DOCUMENTS

| | | | | |
|---|---|---|---|---|
| 2,264,321 A * | 12/1941 | Manson | ........................ | 244/1 R |
| 3,181,823 A * | 5/1965 | Gillmore | .................... | 244/137.2 |
| 3,506,222 A * | 4/1970 | Anderson | .................... | 244/101 |
| 4,032,088 A * | 6/1977 | McAvoy | .................... | 244/100 A |
| 6,644,592 B2 * | 11/2003 | Parrott et al. | ................. | 244/105 |
| 6,709,019 B2 | 3/2004 | Parrott et al. | | |
| 6,709,305 B2 | 3/2004 | Parrott et al. | | |
| 7,115,010 B2 | 10/2006 | Parrott et al. | | |
| 7,207,522 B2 | 4/2007 | Parrott et al. | | |
| 7,270,348 B2 | 9/2007 | Parrott | | |
| 7,309,267 B1 * | 12/2007 | Henry et al. | .................... | 441/40 |
| 2003/0057322 A1 | 3/2003 | Parrott et al. | | |
| 2003/0060101 A1 | 3/2003 | Parrott et al. | | |

FOREIGN PATENT DOCUMENTS

EP 0193265 9/1986

OTHER PUBLICATIONS

International Search Report dated Jan. 28, 2009 in related Application No. PCT/IB2008/002313.

* cited by examiner

*Primary Examiner* — Tien Dinh
(74) *Attorney, Agent, or Firm* — Dean W. Russell; Kilpatrick Townsend & Stockton LLP

(57) ABSTRACT

Flotation systems including separately packed floats and life rafts are disclosed. Such systems, advantageously used for helicopters or other vessels, attach rafts to exterior covers of the floats. Thus, if not needed, or if maintenance or repair is required, the rafts may be removed from the float covers quickly and easily and without unpacking the floats themselves. Likewise, removal of the rafts permits maintenance to be performed on the floats without any need to unpack the rafts. Also identified are mechanisms for indirectly connecting both floats and rafts to vessels and for independently inflating both floats and rafts using a single actuator.

7 Claims, 2 Drawing Sheets

AERAZUR
Helicopter Flotation & Life Raft Systems

Float configuration

- 1 : EFS
- 2 : EFS Bar to support EFS
- 3 : EFS Lower cover
- 4 : EFS Upper cover
- 5a & 5b : EFS Cover flaps to protect cover lacings

- A1 & A2 : Attachments
- B : bar attachment
- C1 & C2 : breakable links
- D1 & D2 : provision flaps for raft integration

FLOTATION SYSTEMS

REFERENCE TO PROVISIONAL APPLICATION

This application is based on and hereby refers to U.S. Provisional Patent Application Ser. No. 60/970,587, filed Sep. 7, 2007, and having the same title as appears above, the entire contents of which provisional patent application are incorporated herein by this reference.

FIELD OF THE INVENTION

This invention relates to flotation systems and more particularly, although not necessarily exclusively, to systems for helicopters or other vessels in which flotation is provided separately for both the vessels and personnel (or cargo) carried by the vessels.

BACKGROUND OF THE INVENTION

U.S. Pat. No. 6,644,592 to Parrott, et al. (the "Parrott '592 patent") provides an example of a type of helicopter flotation system currently available for use. The system includes a C-shaped girt attached directly to a horizontal landing skid of a helicopter. Packed within a flexible cover are multiple "side" and "center" floats which may be inflated upon deployment. Also included within the cover is an inflatable life raft.

As detailed in the Parrott '592 patent, prior to deployment the deflated floats are packed around the deflated raft within the cover. Hence, only upon inflation of the floats do the floats and raft separate in any way. Indeed, inflation of the floats is a prerequisite to exposure of the raft, as such inflation both disengages fasteners associated with the cover (and end caps) and displaces the floats from the raft, thereby allowing for inflation of the raft as well. See, e.g., Parrott '592 patent, col. 3, ll. 9-51; FIG. 1.

Disclosed in U.S. Pat. No. 6,709,305 to Parrott, et al. (the "Parrott '305 patent") is a similar flotation system. Confirmed in the Parrott '305 patent is the deployment sequence of the floats and life raft. When a helicopter must land on water, the system initially is "partially deployed," with the floats being completely inflated "while the raft remains packed." See Parrott '305, col. 3, l. 66 through col. 4, l. 2. Such partial deployment occurs using a first switch, which releases gas from a canister into an air hose and thence to the floats. See id., col. 4, ll. 9-12. Following complete inflation of the floats, a second switch may be employed to inflate the raft. See id., ll. 30-35.

Absent from the Parrott '592 and '305 patents is any discussion of floats and rafts packed independently and not directly attached to any portion of a helicopter. Similarly omitted from these patents is recognition that a life raft need not always be included as part of the flotation system and that maintenance of the floats and raft need not always occur simultaneously. Moreover, situations in which utilizing only a single switch or other actuator for both the floats and raft likewise are not contemplated by the Parrott '592 and '305 patents.

SUMMARY OF THE INVENTION

The present invention seeks to resolve these and other deficiencies in the systems of the Parrott '592 and '305 patents. In the innovative systems, floats and life rafts are packed separately, with rafts being attached onto exterior covers of the floats. Consequently, when the rafts are unneeded or require maintenance, they may be removed quickly and easily by merely detaching them from the float covers. Similarly, removal of the rafts permits maintenance to be performed on the floats without any need to unpack the rafts themselves.

Additionally, floats of the present systems preferably attach to a bar rather than directly to a girt, vertical member, or horizontal landing skid of a vessel such as a helicopter. As a result, removal of both a float and any attached raft may occur simply by disengaging the bar from the helicopter, hence not requiring displacement of any girt, vertical member, or horizontal skid. Alternatively, either or both of the floats and rafts may be integrated into the fuselage of, or otherwise attached within or outside, a vessel.

Present systems further may utilize a single activator for independently inflating both floats and rafts, avoiding any need for two separate devices. Use of such an activator would not prohibit employment of multiple actuation mechanisms, however. Other automatic or manual activators could be used for redundancy or back-up purposes, for example.

Versions of the present invention include at least one inflatable component, such as a float, packed together with a bar or similar elongated object. Preferably, distinct upper and lower covers collectively surround the float and bar over much of their lengths. The bar nevertheless remains available for attachment to a vertical member or other portion of a vessel.

Connected to the exterior of the upper cover may be one or more cover flaps (or similar materials). Such connection may occur in any appropriate way. Presently preferred, however, is that two cover flaps be integrally formed with or adhered to the upper cover.

Packed into a separate bag may be an inflatable life raft. The bag too may include one or more bag flaps or similar materials. Again, presently preferred is that two flaps be utilized, with such bag flaps being formed with or connected to the bag as desired.

When the systems do not include a life raft, the cover flaps may be positioned so as to cover the lacings and connections between at least the upper cover and float and protect them from adverse environmental conditions (including but not limited to wind-related forces and debris). By contrast, when the system includes a raft, the cover flaps typically are unused. The bag flaps perform analogous protective functions with the systems incorporating life rafts, while also providing one means to help attach the packed rafts to the exteriors of the float covers.

It thus is an optional, non-exclusive object of the present invention to provide flotation systems for aircraft and other vessels including helicopters.

It also is an optional, non-exclusive object of the present invention to provide flotation systems including both floats and life rafts.

It is an additional optional, non-exclusive object of the present invention to provide flotation systems in which the floats and life rafts are separately packed but attached at least indirectly when life rafts are beneficially included as parts of the systems.

It is a further optional, non-exclusive object of the present invention to provide flotation systems in which life rafts may be quickly and easily detached from floats, particularly (although not exclusively) for maintenance or repair of either the rafts or the floats without unpacking the other.

It is, moreover, an optional, non-exclusive object of the present invention to provide flotation systems attached to supports, such as bars, rather than directly to any portion of the vessels with which they are associated.

It is another optional, non-exclusive object of the present invention to provide flotation systems in which a single actuator may activate independent inflation of both floats and life rafts.

Other objects, features, and advantages of the present invention will be apparent to persons of requisite skill in appropriate fields with reference to the remaining text and drawings of this application.

DETAILED DESCRIPTION

Figure 1:
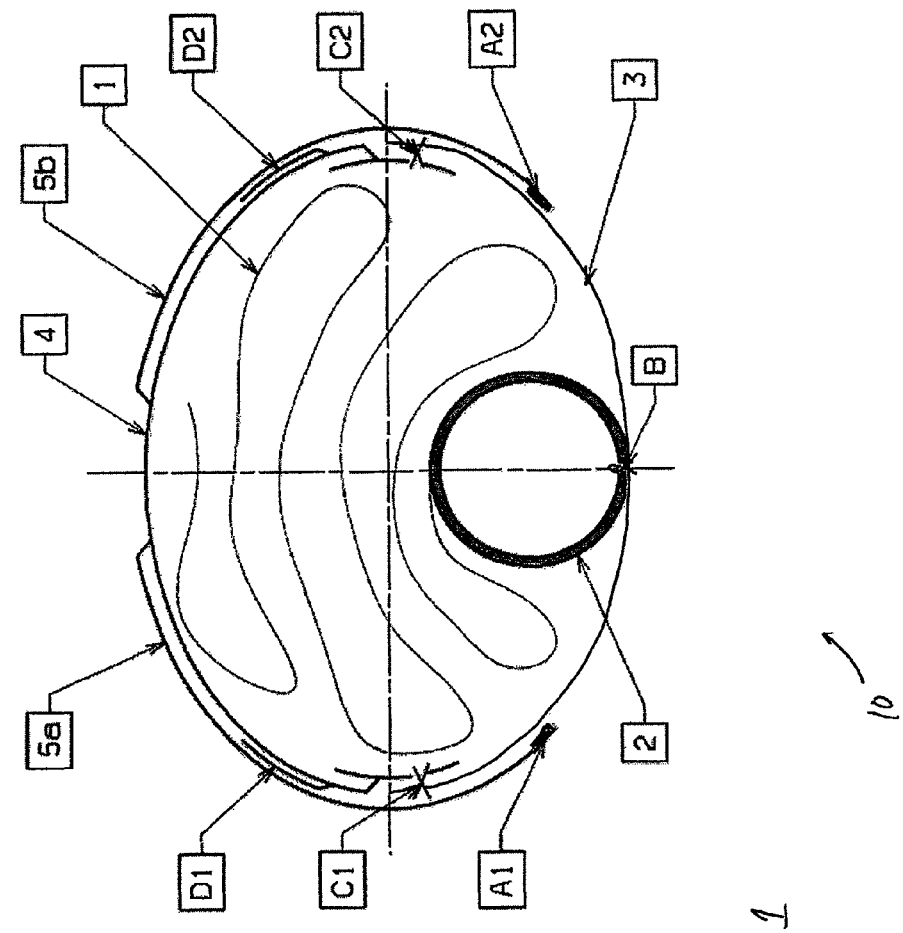
FIG. 1 is a cross-sectional, schematicized depiction of a flotation system of the present invention as packed with a float but without any attached life raft.

Shown in FIG. 1 is an exemplary flotation system 10 of the present invention. System 10 preferably includes float 1, bar 2, respective lower and upper covers 3 and 4, and two cover flaps 5 (designated 5a and 5b). Float 1 advantageously is inflatable (preferably with helium, although possibly with other gases or fluids) and, at least when inflated, buoyant in water.

When packed for transit or attachment to a vessel (i.e. when not in use), system 10 contemplates float 1 being uninflated (see FIG. 1). This allows float 1 to be folded upon itself and packed in a relatively small volume, consistent with its depiction in FIG. 1. Float 1 also may be fastened or otherwise directly or indirectly attached to bar 2 in any appropriate manner.

Float 1 additionally may be attached directly or indirectly to either or both of lower cover 3 and upper cover 4. Any such direct attachment preferably (although not necessarily) occurs via laces placed alternately in eyelets associated with any of float 1 or covers 3 or 4 and tied in a suitable manner. Eyelets, if present, may be fabric-welded or otherwise adhered or connected to the exterior surface of float 1. Whichever method is used to attach the eyelets should not defeat the inflatability of float 1, however.

As depicted in FIG. 1, lower cover 3 and upper cover 4 may overlap, facilitating protection of float 1 prior to deployment. Lower cover 3 and upper cover 4 additionally may, but need not necessarily, be connected to each other (as, for example, at sections or links identified as C1 and C2). If cover 3 and 4 are connected, the connection cannot be so strong as to inhibit proper inflation of float 1. Instead, whether or not connected, covers 3 and 4 should readily separate when float 1 is inflated.

Figure 2:
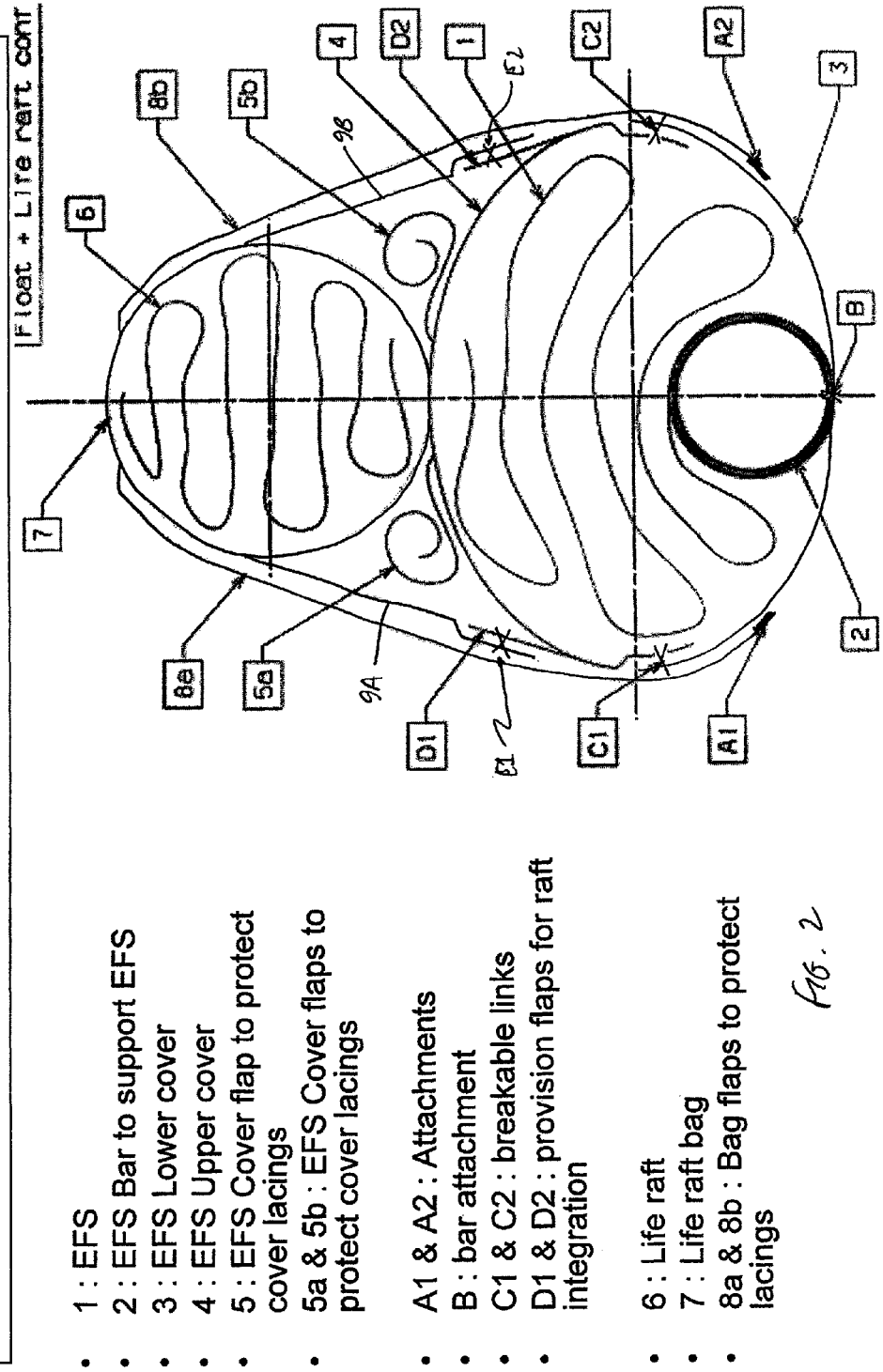
FIG. 2 is a cross-sectional, schematicized depiction of the flotation system of FIG. 1 with an attached life raft.

FIGS. 1-2 further illustrate one or more cover flaps 5 of exemplary system 10. Flaps 5, when present, may be formed with or otherwise connected to upper cover 4 and are at least somewhat flexible. Accordingly, flaps 5 may be moved from a folded or rolled position (see FIG. 2), in which flaps 5A and 5B are unused, to an unrolled position (see FIG. 1) in which each of flaps 5A and 5B covers corresponding sets of eyelets and is connected to lower cover 3 at sections A1 and A2.

Connections at A1 and A2 preferably occur using hook-and-loop fasteners. Those skilled in the relevant art will, however, recognize that other connectors may be employed instead. Similarly, formation of and connections to flaps 5 may be different than as depicted in FIG. 1. Finally, although screws typically connect lower cover 3 and bar 2 at one or more points B, other fastening mechanisms may be utilized for this purpose as well.

Life raft 6 is shown in FIG. 2, as it too may be part of system 10. Raft 6 is intended to be inflatable, preferably with nitrogen, although possibly with other gases of fluids, when deployed for use. However, when packed for transit and prior to deployment, raft 6 preferably is uninflated and contained, wholly or partly, within bag 7.

Illustrated in FIG. 2 are one or more bag flaps 8 associated with bag 7. Analogous to cover flaps 5, bag flaps 8 preferably are two in number (8A and 8B) and are integrally formed with, adhered, or otherwise connected to bag 7. Flaps 8 too are at least somewhat flexible, so they may be connected to lower cover 3 at A1 and A2 (or perhaps instead to upper cover 4). When raft 6 is inflated, bag 7 is designed to open to expose the inflated raft 6 for use.

Primary mechanical connection of bag 7 onto float 1 occurs at links E1 and E2. As shown in FIGS. 1-2, upper cover 4 for float 1 may include one or more provision flaps (with two, designated D1 and D2, being illustrated). Such flaps D1 and D2 may in turn be connected to one or more connector flaps 9A and 9B formed with or connected to bag 7. Although links E1 and E2 preferably comprise eyelets and lacing, other types of fasteners may be used alternatively or additionally. When raft 6 is not present, provision flaps D1 and D2 have no function to provide.

In use, float 1 is designed to inhibit sinking in water of a vessel such as a helicopter. Raft 6, when present, may carry persons or cargo externally of the vessel. However, because raft 6 is not always needed for certain over-water and other flights, its omission could be beneficial from standpoints of, for example, weight, regulations, or cost. Hence, raft 6 is packed separately than float 1 and may be attached thereto or removed therefrom quickly and easily. Further, by utilizing bar 2 to connect system 10 to a vessel, the entire system 10—whether or not raft 6 is included—may be removed from the vessel (when unneeded) without disturbing the vessel structure.

Although not shown in FIGS. 1-2, a single activator may be used, if desired, to inflate both float 1 and raft 6. In one planned version, the activator will include at least two positions, one causing inflation of float 1 and the other causing inflation of raft 6. In this manner, a pilot (or passenger) need merely engage a single device to activate both inflatable components. Preferred embodiments of the single activator are likely to permit differing motions to cause movement to the at least two positions. As noted earlier, use of such an activator would not prohibit employment of multiple actuation mechanisms, however, as other automatic or manual activators could be used for redundancy or back-up purposes.

Inflation of float 1 commences before inflation of raft 6. However, even in a failure mode, for example, in which float 1 unexpectedly initially fails to inflate, raft 6 may still inflate. If, alternatively, inflation of float 1 correctly commences first but unexpectedly is not completed (e.g. float 1 does not inflate fully), inflation of raft 6 nevertheless may occur. Thus, even if inflation of raft 6 is initiated or completed first, such inflation both (a) may occur satisfactorily and (b) should not prevent inflation of float 1.

The foregoing is provided for purposes of illustrating, explaining, and describing embodiments of the present invention. Modifications and adaptations to these embodiments will be apparent to those skilled in the art and may be made without departing from the scope or spirit of the invention. The disclosures of the Parrott '592 and '305 patents are hereby incorporated herein in their entireties by this reference.

What is claimed is:

1. A flotation system comprising:
   a. an inflatable float;
   b. means for inflating the float;
   c. a cover overlaying at least a portion of the float prior to its inflation, the cover comprising:
      i. means for attaching an inflatable raft system thereon;
      ii. an upper cover having an exterior surface; and
      iii. a lower cover; and
   d. at least one cover flap extending externally of the exterior surface of the upper cover; and
   in which the attaching means comprises at least one provision flap extending externally of the exterior surface of the upper cover and the at least one cover flap is configured for movement between a folded or rolled position, in which the at least one cover flap does not overlay the at least one provision flap, to an unfolded or unrolled position, in which the at least one cover flap does overlay the at least one provision flap.

2. A flotation system according to claim 1 in which, in the unfolded or unrolled position, the at least one cover flap is attached to the lower cover.

3. A flotation system according to claim 2 further comprising a bar to which the float is directly or indirectly attached.

4. A flotation system comprising:
   a. an inflatable float;
   b. means for inflating the float; and
   c. a cover overlaying at least a portion of the float prior to its inflation, the cover comprising means for attaching an inflatable raft system thereon;
   d. the inflatable raft system attached on the cover and comprising:
      i. an inflatable raft; and
      ii. a bag containing at least part of the raft prior to its inflation;
   e. at least one cover flap extending externally of the cover, the cover flap being folded or rolled when the inflatable raft system is attached to the cover; and
   f. at least one connector flap extending externally of the bag and attached to the attaching means; and
   in which the float is packed within the cover and the inflatable raft system is configured to be detached from the cover without unpacking the float.

5. A flotation system according to claim 4 in which the means for inflating the float comprises a single activator for activating inflation of both the float and the raft.

6. An aircraft comprising a flotation system comprising:
   a. an inflatable float;
   b. means for inflating the float; and
   c. a cover overlaying at least a portion of the float prior to its inflation, the cover comprising:
      i. means for attaching an inflatable raft system thereon;
      ii. an upper cover having an exterior surface; and
      iii. a lower cover; and
   d. at least one cover flap extending externally of the exterior surface of the upper cover; and
   in which the attaching means comprises at least one provision flap extending externally of the exterior surface of the upper cover and the at least one cover flap is configured for movement between a folded or rolled position, in which the at least one cover flap does not overlay the at least one provision flap, to an unfolded or unrolled position, in which the at least one cover flap does overlay the at least one provision flap.

7. An aircraft according to claim 6 in which the flotation system further comprises the inflatable raft system attached on the cover.

\* \* \* \* \*